(12) United States Patent
Inge et al.

(10) Patent No.: US 8,945,261 B2
(45) Date of Patent: Feb. 3, 2015

(54) APPARATUS FOR CENTRIFUGAL SEPARATION OF SOLID AND/OR LIQUID PARTICLES FROM A FLOW OF GAS

(75) Inventors: Claes Inge, Saltsjö-Duvnäs (SE); Peter Franzén, Huddinge (SE)

(73) Assignee: 3Nine AB, Nacka Strand (SE)

( * ) Notice: Subject to any disclaimer, the term of this patent is extended or adjusted under 35 U.S.C. 154(b) by 16 days.

(21) Appl. No.: 13/822,533

(22) PCT Filed: Sep. 20, 2011

(86) PCT No.: PCT/EP2011/066349
§ 371 (c)(1),
(2), (4) Date: Mar. 12, 2013

(87) PCT Pub. No.: WO2012/052243
PCT Pub. Date: Apr. 26, 2012

(65) Prior Publication Data
US 2013/0174524 A1    Jul. 11, 2013

(30) Foreign Application Priority Data

Oct. 21, 2010   (SE) ........................................ 1051092

(51) Int. Cl.
*B01D 46/18*   (2006.01)
*B04B 5/08*    (2006.01)
(Continued)

(52) U.S. Cl.
CPC . *B01D 45/14* (2013.01); *B04B 5/08* (2013.01); *B04B 5/10* (2013.01); *B04B 5/12* (2013.01)
USPC ................... 55/406; 55/282; 55/437; 55/467; 55/428; 55/400; 55/409; 55/337; 55/385.1; 55/460; 55/302; 95/267; 95/269; 95/271

(58) Field of Classification Search
USPC .......... 55/282, 437, 467, 428, 406–409, 337, 55/385.1, 460, 302; 95/267, 269–271
See application file for complete search history.

(56) References Cited

U.S. PATENT DOCUMENTS

| 2,822,127 A | 2/1958 | Sinn |
| 3,224,588 A | 12/1965 | Ruegg |

(Continued)

FOREIGN PATENT DOCUMENTS

| GB | 534042 A | 2/1941 |
| JP | S5520684 A | 2/1980 |

(Continued)

OTHER PUBLICATIONS

International Search Report for PCT Serial No. PCT/EP2011/066349 dated Dec. 8, 2011.

(Continued)

*Primary Examiner* — Dung H Bui
(74) *Attorney, Agent, or Firm* — McCormick, Paulding & Huber LLP

(57) ABSTRACT

Apparatus for centrifugal separation of solid and/or liquid particles from a flow of gas, wherein two or more rotors (12) provided with conical separation surface elements (16) are located in a surrounding stationary casing (14), which delimits a common chamber (15) for collecting particles separated in the rotors. Each rotor has a fan (26) rotating together therewith. The fans (26) of the rotors are located in a common fan housing (30) that is separate from and adjacent to the casing (14) defining the collection chamber (15).

6 Claims, 3 Drawing Sheets

(51) Int. Cl.
*B04B 5/10* (2006.01)
*B01D 45/14* (2006.01)
*B04B 5/12* (2006.01)

(56) References Cited

U.S. PATENT DOCUMENTS

| | | | | |
|---|---|---|---|---|
| 4,789,476 A | * | 12/1988 | Schulz | 55/460 |
| 7,645,310 B2 | | 1/2010 | Krisko et al. | |
| 2010/0206166 A1 | * | 8/2010 | Tuomas | 95/271 |

FOREIGN PATENT DOCUMENTS

| | | |
|---|---|---|
| WO | 2007094724 A1 | 8/2007 |
| WO | 2009051545 A1 | 4/2009 |
| WO | 2009126094 A1 | 10/2009 |

OTHER PUBLICATIONS

International Search Report for ITS/SE10/00318 dated May 4, 2011.
Chinese office action for corresponding application No. CN201180050803.2 dated May 29, 2014 (13 pages).

* cited by examiner

APPARATUS FOR CENTRIFUGAL SEPARATION OF SOLID AND/OR LIQUID PARTICLES FROM A FLOW OF GAS

CROSS REFERENCE TO RELATED APPLICATIONS

This application is entitled to the benefit of and incorporates by reference essential subject matter disclosed in International Patent Application No. PCT/EP2011/066349 filed on Sep. 20, 2011 and Swedish Patent Application No. 1051092-3 filed Oct. 21, 2010.

TECHNICAL FIELD

The present invention relates to an apparatus for centrifugal separation of solid and/or liquid particles from a flow of gas.

BACKGROUND OF THE INVENTION

When separating solid and/or liquid particles from a flow of gas a separator of the type is used, which comprises a rotor rotatably mounted in a stationary casing and carrying a plurality of narrowly spaced separation elements in the form of conical discs between which the flow of gas can pass and onto the inwardly sides of which, that face the center axis of the rotor, the particles can be trapped by means of centrifugal forces acting thereon and then be thrown out against the inside of the surrounding casing and finally be discharged from the casing through at least one particle outlet.

In order to clean extremely large gas flows with such centrifugal separators, e.g. flows up to 1000 m³/h and more, either an extremely large centrifugal separator has to be manufactured or must a plurality of discrete separators of the kind mentioned be arranged in parallel, which leads to very high costs for the manufacturing and the investments of such centrifugal separators. Also, they take up a great deal of space.

GB 534042 discloses an apparatus for centrifugal separation of particles from a flow of gas, wherein two or more separation rotors are arranged in a common surrounding casing. The apparatus comprises separation rotors in the form of drums having axial, peripheral blades of much less separation capability than rotors having conical, radial surface elements. Furthermore, it comprises an external fan arranged at a distance downstream of the outlet pipes from the separator units, which results in a worse flow-through and separation of the respective rotor.

SUMMARY OF THE INVENTION

It is an object of the present invention to provide an apparatus which makes it possible to substantially reduce the manufacturing costs and the need for space of centrifugal separators for cleaning of very large flows of gas and at the same time improve the flow-through and the separation in the respective rotor.

For this purpose the present invention provides for an apparatus for centrifugal separation of solid and/or liquid particles from a flow of gas, which is characterized by the features set forth in the independent claim 1. Such an apparatus with a great capacity of separation and operating with the principle of counter-current separation contains two, or preferably more separation rotors known per se with conical surface elements located in a common, surrounding casing, where cleaned gas can be discharged from the casing by means of a fan rotating together with each rotor for generating the flow of gas through the apparatus, wherein the fans of the rotors are arranged in a common fan housing which is separated from and adjacent to the casing defining the collection chamber for a common discharge of cleaned gas from the rotors. This provides for great savings of material and thereby manufacturing costs as well as less need for space in comparison with a single large centrifugal separator or a plurality of discrete smaller centrifugal separators arranged in parallel and having the same total capacity of cleaning and individual casings. Furthermore, an improved flow-through and separation in the individual rotors is obtained.

Another essential advantage of the invention is the possibility of simple assembly of the separator by putting together open basic modules of the casing for adaption to the desired final size, configuration and capacity of the separator.

Other advantageous structural details of the apparatus of the invention are set forth in the dependent claims.

The present invention is described more in detail below with reference to the accompanying drawings.

DETAILED DESCRIPTION OF PREFERRED EMBODIMENTS

Figure 1:
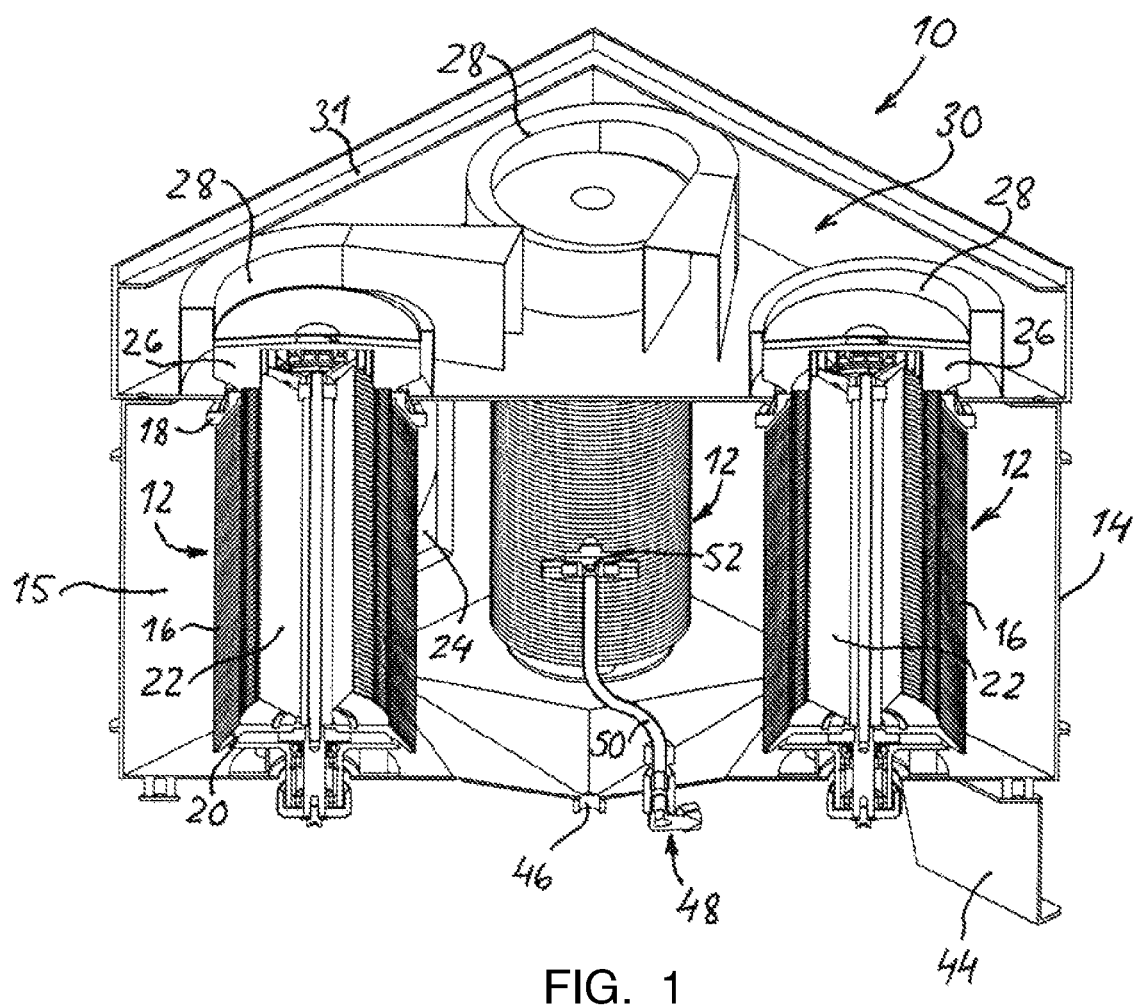
FIG. 1 illustrates in a diagonally cut perspective view an apparatus of the invention operating with a counter-current separation.

In FIG. 1 10 generally denotes a first embodiment of an apparatus of the invention for centrifugal separation of solid and/or liquid particles from a flow of gas. The apparatus comprises four vertically arranged rotors 12 (only three shown) rotatably and sealingly mounted in a common stationary casing 14 which defines a particle collection chamber 15. The rotors 12 are, in a conventional manner, built up by a great number of surface elements 16, onto which particles in the gas flow can be trapped, in this case conical disc elements stacked onto one another with a narrow radial flow gap between the adjacent disc elements which are clamped between an upper and a lower end plate 18 and 20, respectively. The surface elements 16 delimits an outlet shaft 22 in the central portion of each rotor 12, into which the unclean flow of gas, sucked through an inlet 24 of the casing 14, can flow through the flow gaps between the surface elements 16. The intake of unclean gas in the casing 14 and through the shafts 22 of the rotors 12 is preferably generated by means of a respective fan 26 rotating together with the rotor 12 and located in close connection to an upper outlet end of the shafts 22. In the embodiment of FIG. 1 the fans 26 are enclosed in a respective helix cover 28 and located in a common fan housing 30 which is separated from and adjacent to the casing 14 defining the collection chamber 15 for a common discharge of cleaned gas from the rotors. Clean gas can be discharged to the environment, possibly through a filter unit, such as a Hepa filter. In FIG. 1 a Hepa filter (not shown) is adapted to be mounted on an inwardly directed flange 31 of the upper portion of the fan housing 30 so as to cover the housing 30 and allow cleaned gas to be discharged to the environment.

Figure 2:
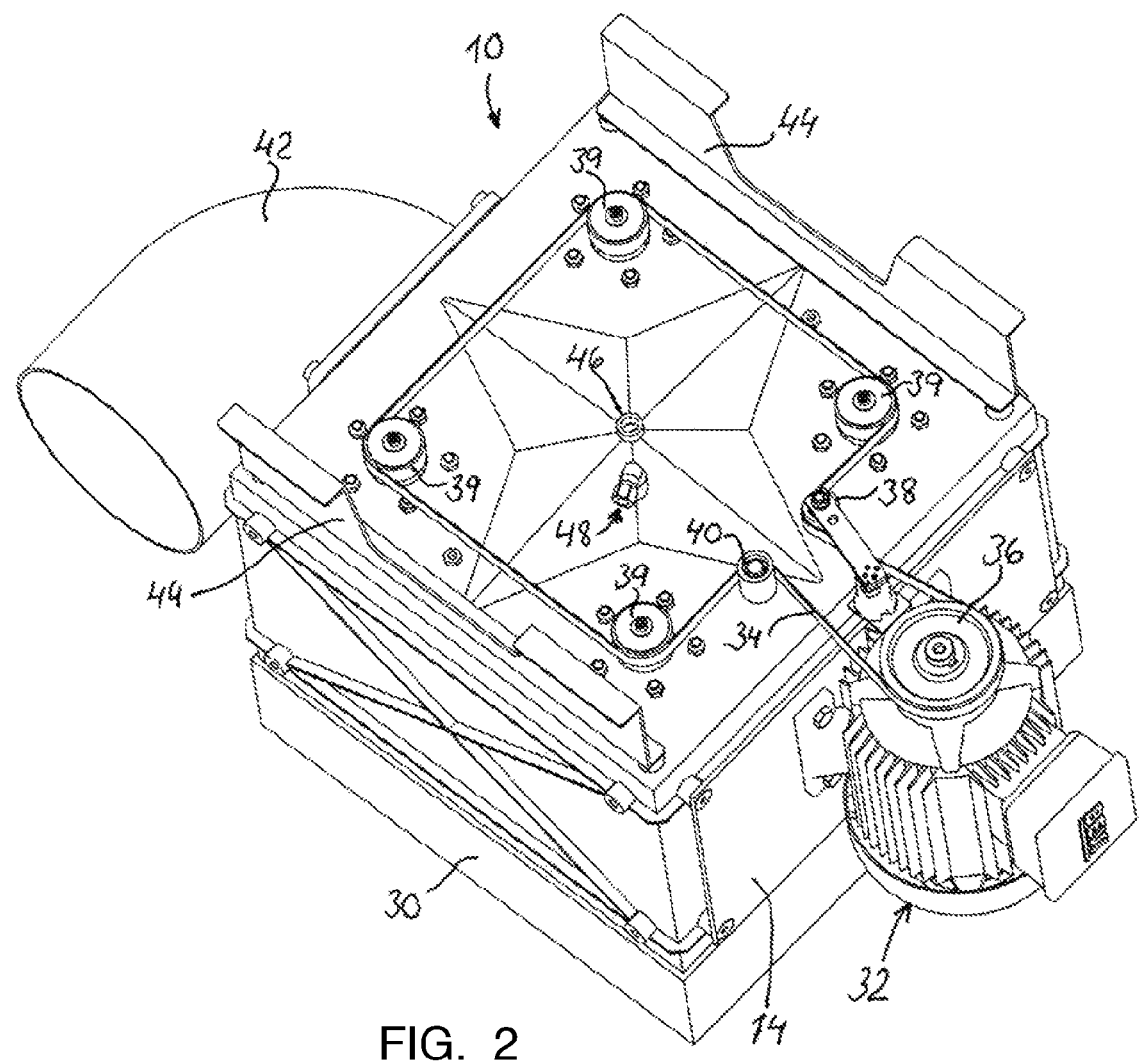
FIG. 2 is a perspective view from below of the entire apparatus in FIG. 1.

As shown in FIG. 2, illustrating the apparatus from below, the rotors 12 are driven by an electric motor 32 through an endless belt 34 which runs over a pulley 36 of the motor 32, a tension pulley 38, pulleys 39 on the rotor shafts and over a guide pulley 40. In FIG. 2 an inlet pipe 42 for the flow of unclean gas connected to the inlet 24 of the casing 14 is also shown, as well as stand components 44 for supporting the apparatus on a foundation. In FIGS. 1 and 2 46 denotes an outlet for the discharge of particles and floating slurry having been collected in the chamber 15 of the casing 14.

Furthermore, the apparatus 10 is preferably provided with at least one unit 48 for cleaning the surface elements 16 of the rotors 12 in the collection chamber 15. The unit 48 may have a liquid supply pipe 50 with a nozzle unit 52 disposed centrally in the chamber 15 and having individual nozzles 54 directed towards the respective rotor 12. Alternatively, the nozzle unit can be located in the gas inlet 24 of the casing 14.

In the embodiment of FIG. 1 the apparatus 10 of the invention has four rotors 12 in a common casing 14. However, in order to save weight, size and thus manufacturing costs in comparison with a very large single centrifugal separator or many discrete separators connected in parallel and having equal total cleaning capacity, the apparatus may have even more rotors in a common surrounding casing. Then, the final common casing is assembled by means of relatively small open basic modules of the casing for adaption to the desired final size and configuration of the separator, dependent on the type and the number of rotors to be included in the casing and thereby the size of the flow of unclean gas to be cleaned, i.e. the desired cleaning capacity of the separator. Thus, the apparatus 10 shall include at least two but preferably several rotors in the same casing. The apparatus 10 in FIGS. 1 and 2 may thus be built to include for example six or eight, or even more rotors 12, by connecting and uniting further outer casing sections and bottom sections of the modules.

Figure 3:
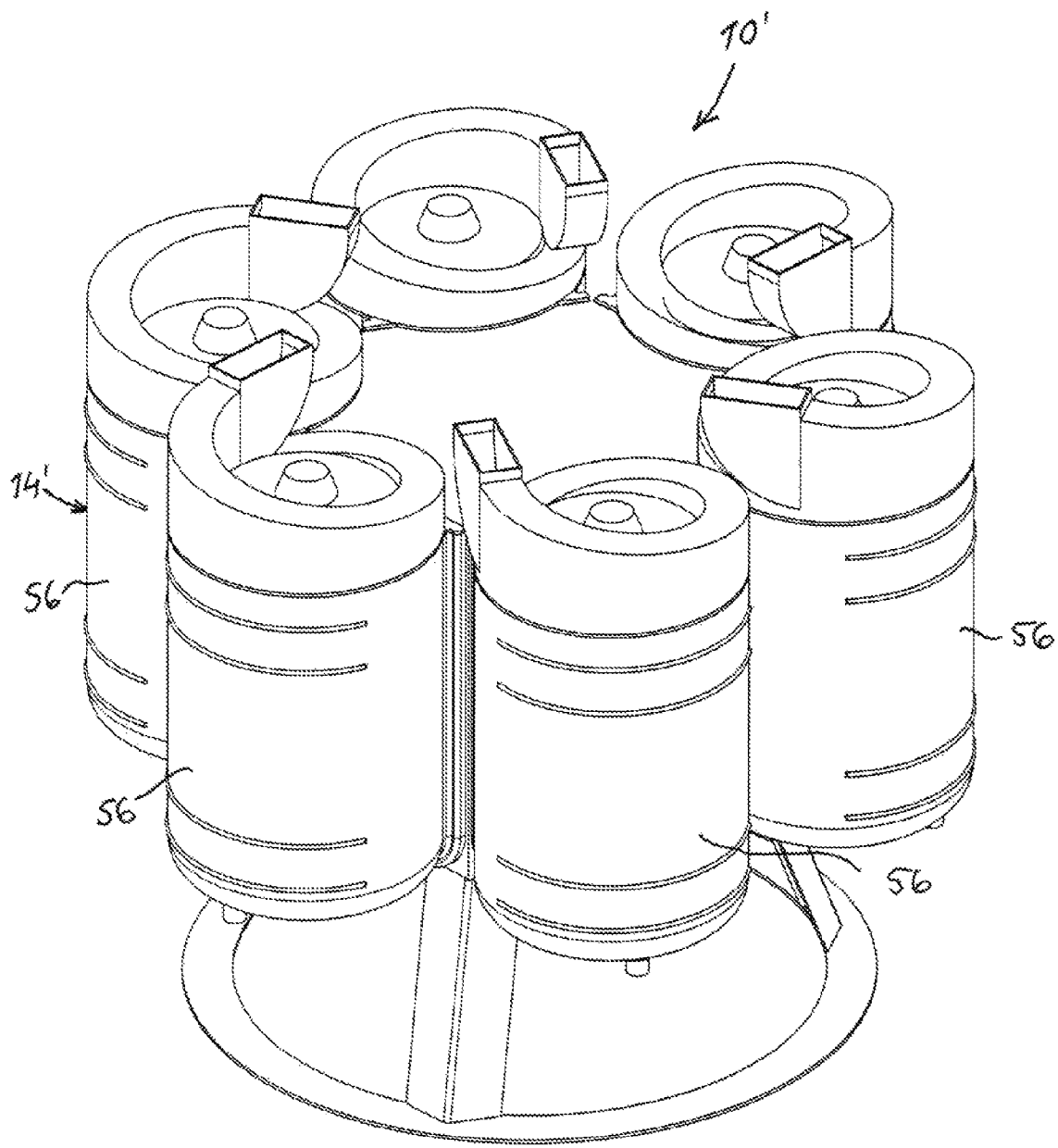
FIG. 3 illustrates an apparatus of the invention, the common casing of which is defined by assembled, partly cylindrical casings of six separator modules.

FIG. 3 discloses another conceivable embodiment of an apparatus 10' of the invention assembled by modules. Here the apparatus 10' has six rotors (not shown), and the common casing 14' is formed by six assembled, partly cylindrical outer walls 56. Possibly, a seventh rotor may be arranged in the central space between the six outer rotors.

The apparatuses of the type discussed above operate in the following manner: When the rotors 12 have reached their relevant operational speed, the fans 26 in the fan housing 30 generate a negative pressure that sucks a flow of unclean gas with solid and/or liquid particles into the chamber 15 of the casing 14 through the inlet pipe 42 and the inlet 24, after which the gas flows radially inwardly into the shafts 22 of the rotors through the narrow flow gaps between the surface elements 16. While the gas passes radially inwardly through the flow gaps the particles in the gas are caused to be trapped or caught on insides of the surface elements 16 facing the center axis of the rotor owing to centrifugal forces acting on the particles, whereby the particles form aggregates which slide out towards the outer periphery of the surface elements and then are thrown towards inside wall of the casing 14 and then flow out through the particle outlet 46. Thus, this apparatus operates according to the counter-current separation principle, since the flow of gas flows in a direction counter to the pump or flow direction created by the proper rotation of the rotors.

While the present invention has been illustrated and described with respect to a particular embodiment thereof, it should be appreciated by those of ordinary skill in the art that various modifications to this invention may be made without departing from the spirit and scope of the present.

What is claimed is:

1. An apparatus for centrifugal separation of solid and/or liquid particles from a flow of gas, where two or more rotors are arranged in a surrounding, stationary casing, which delimits a common collection chamber for particles separated in the rotors and in which the rotors are rotatably mounted, said casing having at least one inlet for the flow of gas to be cleaned from particles, and at least one particle outlet for the discharge of particles separated and collected in the casing, wherein each rotor has a plurality of adjacent conical surface elements with an inside facing the rotor axis and on which the particles in the gas flow can be trapped by centrifugal forces during the radial passage inwardly of the gas through flow gaps between the surface elements, said surface elements of each rotor delimits at least one axial outlet shaft in the central part of the rotor which communicates with the flow gaps between the surface elements and from which cleaned gas can be discharged out of the casing by means of a fan rotating together with each rotor for generating the flow of gas through the apparatus, said fan being located adjacent to an outlet end of the shaft, and all fans of the rotors being arranged in a common fan housing that is separate from and adjacent to the casing defining the collection chamber for a common discharge of cleaned gas from the rotors.

2. The apparatus according to claim 1, wherein each fan is provided with a respective helix cover for the discharge of cleaned gas from the rotors.

3. The apparatus according to claim 1, further comprising a unit located centrally in the particle collection chamber for flushing the surface elements.

4. The apparatus according to claim 1, further comprising a unit located in the gas inlet for flushing the surface elements.

5. The apparatus according to claim 2, further comprising a unit located centrally in the particle collection chamber for flushing the surface elements.

6. The apparatus according to claim 2, further comprising a unit located in the gas inlet for flushing the surface elements.

* * * * *